United States Patent
Chan et al.

(10) Patent No.: US 8,643,655 B2
(45) Date of Patent: Feb. 4, 2014

(54) METHOD AND SYSTEM FOR COMMUNICATING WITH EXTERNAL DEVICE THROUGH PROCESSING UNIT IN GRAPHICS SYSTEM

(75) Inventors: Shany-I Chan, Taipei (TW); Ching-Yee Feng, Xindian (TW); Shih-Da Wu, Taipei (TW); Li-Kai Cheng, Jhonghe (TW); Li-Ling Chou, Banqiao (TW); Yu-Kuo Chiang, Banqiao (TW); Yu-Li (David) Ho, Taipei (TW)

(73) Assignee: Nvidia Corporation, Santa Clara, CA (US)

( * ) Notice: Subject to any disclaimer, the term of this patent is extended or adjusted under 35 U.S.C. 154(b) by 598 days.

(21) Appl. No.: 12/617,638

(22) Filed: Nov. 12, 2009

(65) Prior Publication Data

US 2011/0109636 A1      May 12, 2011

(51) Int. Cl.
*G06F 15/00*      (2006.01)
(52) U.S. Cl.
USPC .......................................... 345/501; 345/520
(58) Field of Classification Search
USPC ............................ 386/353; 717/104; 345/204
See application file for complete search history.

(56) References Cited

U.S. PATENT DOCUMENTS

| | | | |
|---|---|---|---|
| 7,366,878 B1 | 4/2008 | Mills et al. | |
| 8,031,197 B1 * | 10/2011 | Williams et al. | 345/501 |
| 8,284,205 B2 * | 10/2012 | Miller et al. | 345/502 |
| 2004/0160446 A1 | 8/2004 | Gosalia et al. | |
| 2004/0239676 A1 * | 12/2004 | Yoo | 345/501 |
| 2007/0098355 A1 * | 5/2007 | Kim | 386/46 |
| 2007/0242062 A1 * | 10/2007 | Guo et al. | 345/204 |
| 2008/0120592 A1 * | 5/2008 | Tanguay et al. | 717/104 |
| 2008/0187053 A1 | 8/2008 | Zhao et al. | |
| 2008/0289552 A1 * | 11/2008 | Kawaguchi et al. | 112/445 |
| 2009/0060455 A1 * | 3/2009 | Pan et al. | 386/353 |
| 2009/0147017 A1 | 6/2009 | Jiao et al. | |
| 2010/0265250 A1 * | 10/2010 | Koenig et al. | 345/419 |
| 2011/0052142 A1 * | 3/2011 | Sultenfuss et al. | 386/232 |
| 2011/0080413 A1 * | 4/2011 | Damle | 345/501 |

OTHER PUBLICATIONS

Taiwan Office Action dated Mar. 6, 2013, Taiwan Patent Application No. 099107744.

* cited by examiner

*Primary Examiner* — Phi Hoang
(74) *Attorney, Agent, or Firm* — Patterson + Sheridan, L.L.P.

(57) ABSTRACT

The present invention sets forth a method and system for communicating with an external device through a processing unit in a graphics system of a computing device. In one embodiment, the method comprises allocating a first set of memory buffers having a first memory buffer and a second memory buffer in the graphics system based on an identification information of the external device, and invoking a first thread processor of the processing unit of the graphics system to perform services associated with a physical layer according to the identification information of the external device by storing a first data stream received from the external device through an I/O interface of the processing unit of the graphics system in the first memory buffer and retrieving a second data stream from the second memory buffer for transmission to the external device through the I/O interface.

22 Claims, 5 Drawing Sheets

METHOD AND SYSTEM FOR COMMUNICATING WITH EXTERNAL DEVICE THROUGH PROCESSING UNIT IN GRAPHICS SYSTEM

BACKGROUND OF THE INVENTION

1. Field of the Invention

Implementations of the present invention generally relate to a processing unit in a graphics system, and, more specifically, to a method and system for communicating with an external device through the processing unit in the graphics system.

2. Description of the Related Art

A computing device may communicate with an external device through a communication network such as a Local Area Network (LAN) or a Wireless LAN (WLAN). Alternatively, the device may communicate with the external device via a physical connection. Data streams received via the network connection or via the physical connection are traditionally sent to a first processing unit of the computing device (e.g., a central processing unit (CPU)) through a south bridge chip and also the north bridge chip. Thereafter, the processing unit may send certain received data streams to a graphics system having a second processing unit (e.g., a Graphics Processing Unit (GPU)) for further processing.

In other words, before the data streams from either the network connection or the physical connection reach the second processing unit of the graphics system, the data streams need to go through at least some physical layer chips on a network adaptor (e.g., Gigabit Ethernet card), the PCIE interface, and the first processing unit of the computing device. The inefficiencies and delays associated with having the received data streams travel through these various components of the device may be improved by utilizing the unused hardware resources of the graphics system, so that the received data streams intended for the second processing unit are routed to the second processing unit directly.

As the foregoing illustrates, what is needed in the art is thus a method and a system for communicating with an external device through a processing unit in a graphics system and address at least the foregoing issues.

SUMMARY OF THE INVENTION

One embodiment of the present invention sets forth a method and system for communicating with an external device through a processing unit in a graphics system of a computing device. The method includes the steps of allocating a first set of memory buffers having a first memory buffer and a second memory buffer in the graphics system based on an identification information of the external device, and invoking a first thread processor of the processing unit to perform services associated with a physical layer according to the identification information of the external device by storing a first data stream received from the external device through an I/O interface of the processing unit in the first memory buffer and retrieving a second data stream from the second memory buffer for transmission to the external device through the I/O interface.

One advantage of the disclosed method is to provide additional transmission path for the data stream to and from the external device by utilizing the thread processor of a processing unit in a graphics system to access the incoming and outgoing data stream in the memory buffers. The additional transmission path may thus route the data stream to the processing unit of the graphics system directly, thereby improving the efficiency of the data stream transmission for graphics processing.

BRIEF DESCRIPTION OF THE DRAWINGS

So that the manner in which the above recited features of the present invention can be understood in detail, a more particular description of the invention, briefly summarized above, may be had by reference to implementations, some of which are illustrated in the appended drawings. It is to be noted, however, that the appended drawings illustrate only typical implementations of this invention and are therefore not to be considered limiting of its scope, for the invention may admit to other equally effective implementations.

DETAILED DESCRIPTION

Embodiments of the present invention are to be illustrated through open systems interconnection (OSI) layered model developed by the International Organization for Standards (ISO). The OSI layered model describes the exchange of information between layers in communication networks. The OSI layered model is particularly useful for separating the technological functions of each layer, and thereby facilitating the modification or update of a given layer without detrimentally impacting on the functions of other layers. The events happening in the present invention may occur at different layers of the OSI model. For example, at a lower most layer, the OSI model has a physical layer that is responsible for encoding and decoding data stream for transmission across a particular medium. Above the physical layer is a data link layer providing reliable transmission of the data stream over a network and interfacing appropriately with the physical layer. In the present invention, a processing unit in a graphics system (e.g., a GPU) may be responsible for the data stream transmission in both physical layer and data link layer. At the top of the OSI model is an application layer which provides users with suitable interfaces for accessing and connecting to a network. In the present invention, suitable interfaces may include web browsers and FTP application for the data stream transmission.

Figure 1:
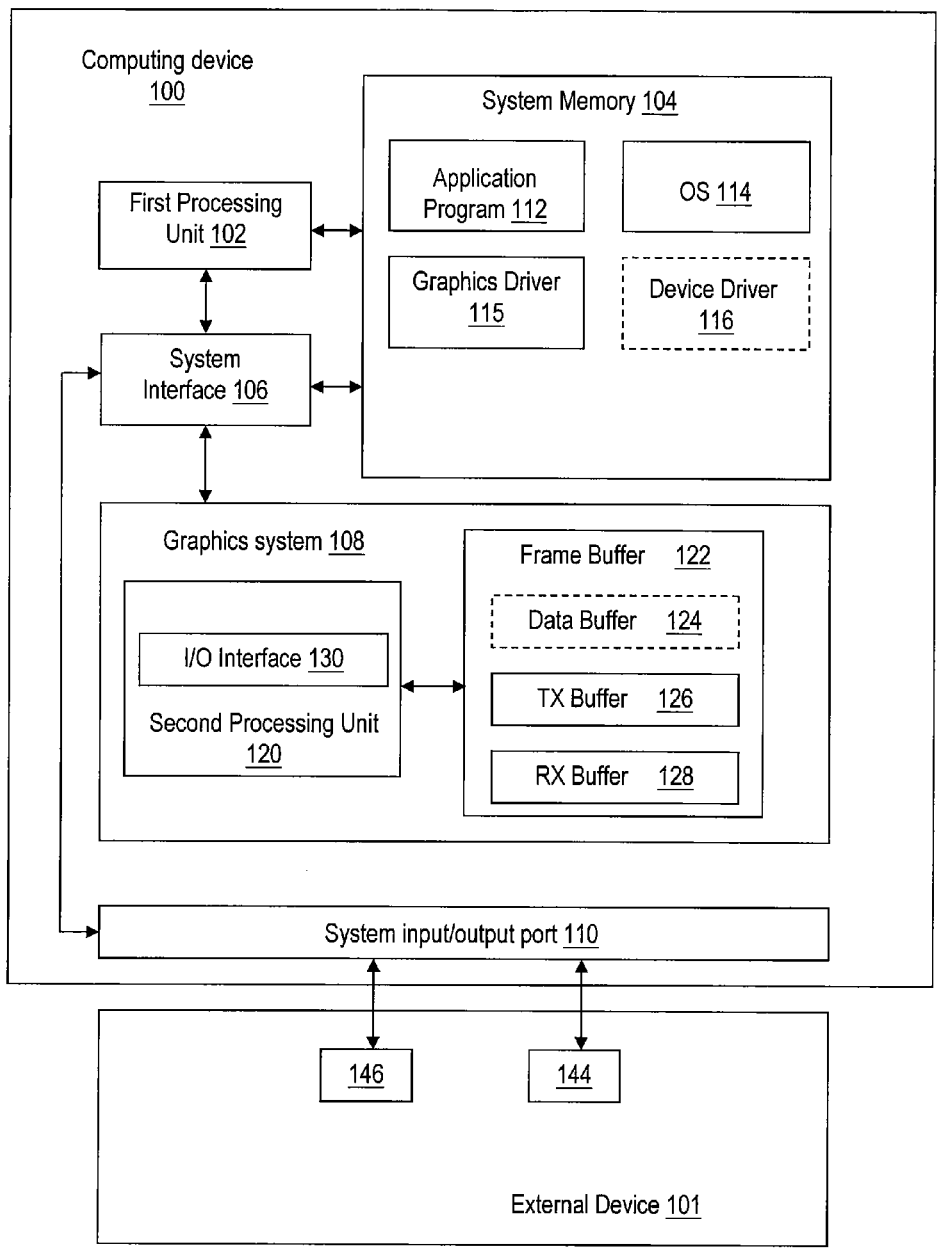
FIG. 1 is a simplified block diagram of a computing device adapted to implement one or more aspects of the present invention.

FIG. 1 is a simplified block diagram of a computing device 100 adapted to implement one or more aspects of the present invention. The computing device 100 may be a desktop computer, server, laptop computer, game console, or the like. The computing device 100 is to be in communication with an external device 101. The computing device 100 comprises a first processing unit 102. In addition to the first processing unit 102, the computing device 100 may further include a system memory 104, a system interface 106, a graphics system 108, and a system input/output (I/O) port 110. In one implementation, the external device 101 may be an external computing device communicating with the computing device 101 through a network. In another implementation, the external storage device 101 may be an external storage device in connection with the computing device 100.

The first processing unit 102 connects to the system memory 104 and the graphics system 108 via the system interface 106. The system interface 106 may include a system bus such as Accelerated Graphics Port ("AGP") bus, Peripheral Component Interface Express ("PCIE") bus, and other industry standard interfaces adapted to couple the first processing unit 102 and the graphics system 108. The system memory 104 may include an application program 112, an operating system (OS) 114, and a graphics driver 115. In one implementation, the application program is a browser. In another implementation, the application program is a file transfer protocol (FTP) application.

The graphics system 108 may comprise a second processing unit 120 coupled to a frame buffer 122. An example of the second processing unit 120 is a graphics processing unit (GPU). The second processing unit 120 further includes an Input/Output (I/O) interface 130, such as a module I/O (MIO) port. The frame buffer 122 may comprise memory space that could be at least including a transmitting (TX) buffer 126 and a receiving (RX) buffer 128. Meanwhile, the frame buffer 122 optionally may allocate a memory space for a data buffer 124.

Optionally, the system memory 104 may include a device driver 116. The device driver 116 may enable the communication between the external device 101 and the second processing unit 120. In one implementation, the device driver 116 includes a LAN driver. In another implementation, the device driver 116 includes an IEEE-1394 driver for facilitating a communication with an IEEE 1394-based external device. The device driver 116 may be pre-installed into the computing device 100. As such, the device driver 116 may be loaded for facilitating the communication between the external device 101 and the second processing unit 120. For example, to enable the second processing unit 120 to communicate with the external device 101 through a LAN the LAN driver 116 may be installed. When the second processing unit 120 is to communicate with the external device 101 through a 1394-based connection, the IEEE-1394 driver may be installed beforehand.

The external device 101 may comprise communication ports 144 and 146 for a connection with the system I/O port 110. In one implementation, the communication ports 144 and 146 may be a LAN connector and an IEEE-1394 connector, respectively. It is worth noting that the term of the data stream may include commands and data.

Identification information associated with the external device 101 may be necessary before a general driver (not shown) provided by the OS 114 could invoke a corresponding driver or ask for an installation of that corresponding driver if the latter has not been installed. In one implementation, the identification information may be received through the system I/O port 110 from the external device 101. In another implementation, the computing device 100 may be preconfigured with the identification information.

To facilitate the communication between the second processing unit 120 and the external device 101, the second processing unit 120 may be responsible to perform services associated with a physical layer. In one implementation, the service associated with the physical layer includes transmitting raw bits of a data stream through a physical medium. The second processing unit 120 may be responsible to perform services associated with a data link layer as well. In one implementation, the service associated with the data link layer includes providing a protocol for a data stream transmission and detection/correction of errors in the transmission of the data stream. As such, when any communication with the external device 101 is to be established the device driver 116 may communicate with the graphics driver 115. And the graphics driver 115 may thus allocate a predetermined number of memory buffers and a predetermined number of thread processors for the communication purpose. It is worth noting that the identification information of the external device 101 may be received at time T1 while the allocation of the memory buffers and the invocation of the thread processors may take place at time T2. In one implementation, T1 is immediately prior to T2.

It is worth noting that each of the data link layer and the physical layer operation of the second processing unit 120 may be associate with a thread processor of the second processing unit 120. It is also worth noting that both the data link layer and the physical layer of the communication may be associated with the TX buffer 126, and the RX buffer 128 in the frame buffer 122 of the second processing unit 120. Furthermore, the data link layer of the communication may be associated with the data buffer 124 in the frame buffer 122 of the second processing unit 120. The communication between the second processing unit 120 and the external device 101 may associate with only one thread processor. And that thread processor may be responsible for the services associated with the physical layer.

When the application program 112 is to transfer an outgoing data stream to the external device 101 through the LAN, the application program 112 may cause the device driver 116 (LAN driver) to communicate with the graphics driver 115. And the graphics driver 115 may thus invoke the thread processor associated with the data link layer of the second processing unit 120. As such, the invoked thread processor may fetch the outgoing data stream from the data buffer 124 and to put the outgoing data stream to the TX buffer 126. The graphics driver 115 may also cause the thread processor associated with the physical layer of the second processing unit 120 to fetch the outgoing data stream from the TX buffer 126 to the I/O interface 130. The device driver 116 may further have the outgoing data stream to be transmitted from the I/O interface 130 to the system I/O port 110. Thereafter, the outgoing data stream may be transmitted to the external device 101.

When the application program 112 is to receive an incoming data stream from the external device 101, the device driver 116 may cause the graphics driver 115 to invoke the thread processor associated with the physical layer of the second processing unit 120. As such, the invoked thread processor may fetch an incoming data stream from the system I/O port 110 to the I/O interface 130. And the thread processor may further fetch the incoming data stream from the I/O interface 130 and place the incoming data stream into the RX buffer 128. The device driver 116 may also cause the graphics driver 115 to invoke the thread processor associated with data link layer so as to fetch the received incoming data stream from the RX buffer 128 and to put the incoming data stream to the data buffer 124. The device driver 116 may also cause the graphics driver 115 to utilize the second processing unit 120 to process the incoming data stream. Thereafter, the processed incoming data stream may be put to the data buffer 124. The device driver 116 may then feed the processed data stream from the data buffer 124 to the application program 112.

Figure 2:
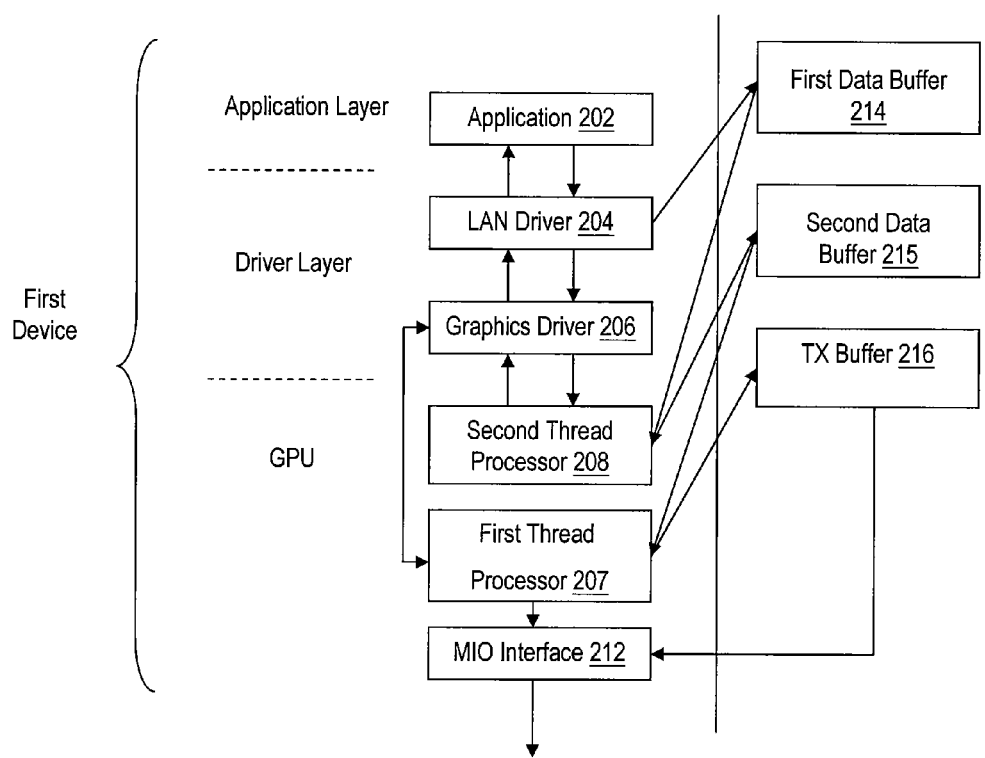
FIG. 2 is a schematic diagram for illustrating a LAN communication for transmission of a first data stream to a second device from a first device according to one embodiment of the present invention.

FIG. 2 is a schematic diagram 200 for illustrating a LAN communication for transmission of a first data stream to a second device from a first device according to one embodiment of the present invention. For the illustration purpose, the transmission of the first data stream involves an application 202 at an application layer, a LAN driver 204 and a graphics driver 206 at a driver layer, a first thread processor 207, a second thread processor 208, and a MIO interface 212 at a processing unit of a graphics system such as a graphics processing unit (GPU), and a first data buffer 214, a second data buffer 215, and a transmitting (TX) buffer 216 at a memory space associated with the processing unit of the graphics system. It is worth noting that though the first data buffer 214 and the second data buffer 215 may be utilized they may be in the same physical memory space. The distinction of the first data buffer 214 and the second data buffer 215 is for the purpose of the illustration. The application layer, the driver layer, the processing unit of the graphics system, and the memory are associated with the first device from which the first data stream is outputted. It is worth noting that the first thread processor 207 and the second thread processor 208 may be invoked after a receipt of an identification device associated with the second device. Similarly, the first data buffer 214, the second data buffer 215, and the TX buffer 216 are allocated after the receipt of the identification information of the second device also. The first thread processor 207 is configured to perform services associated with the physical layer while the second thread processor 208 is configured to perform services associated with the data link layer.

To transmit the first data stream, the LAN driver 204 may store the first data stream to the first data buffer 214. Thereafter, the LAN driver 204 would notify the graphics driver 206 that the first data stream is available at the first data buffer 214. The graphics driver 206 may then cause the second thread processor 208 to obtain the first data stream, process the first data stream, and store the first data stream to second data buffer 215. Thereafter, the LAN driver 204 may communicate with the graphics driver 206, so that the graphics driver 206 may cause the first thread processor 207 to retrieve the first data stream from the second data buffer 215, process the retrieved first data stream, and put the processed first data stream to the TX buffer 216. The processing performed by the first thread processor 207 may include packetizing the first data stream. The graphics driver 206 may further cause the first thread processor 207 to place the first data stream in the MIO interface 212 so that the first data stream could be transmitted to the second device. The transmission of the first data stream to the MIO interface 212 may take place after the first thread processor 207 packetizes the first data stream. Since a parallel-computing architecture processing unit in a graphics system (e.g., a GPU of compute unified device architecture (CUDA)) may have numerous thread processors available, the first thread processor 207 and the second thread processor 208 could be chosen from any of the available thread processors for the data stream communication with the external device.

Figure 3:
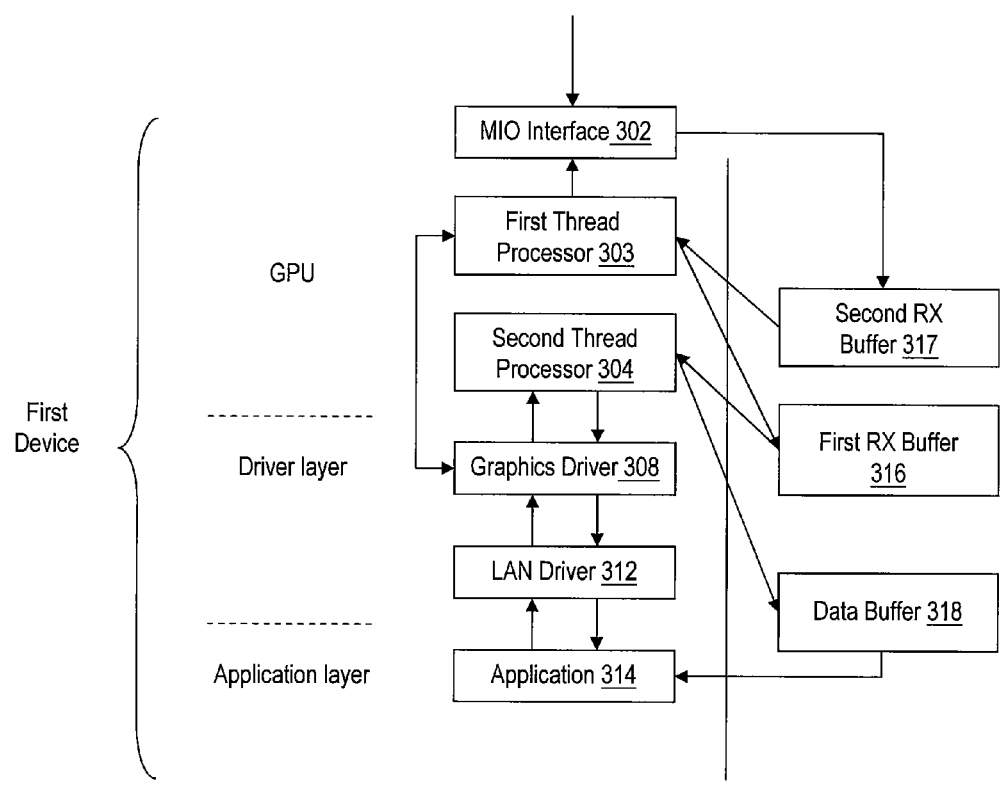
FIG. 3 is a schematic diagram for illustrating a LAN communication for receipt of a second data stream from a second device to a first device according to one embodiment of the present invention.

FIG. 3 is a schematic diagram 300 for illustrating a LAN communication for receipt of a second data stream from a second device to a first device according to one embodiment of the present invention. For the illustration purpose, the transmission of the second data stream involves a MIO interface 302, a first thread processor 303, a second thread processor 304, a graphics driver 308 and a LAN driver 312, an application 314 at an application layer, and a first receiving (RX) buffer 316, a second RX buffer 317, and a data buffer 318. It is worth noting that the first RX buffer 316 and the second RX buffer 317 may be the same physical memory space for the illustration purpose. It is also worth noting that the first thread processor 303 and the second thread processor 304 may be invoked after a receipt of the identification information (e.g., a device ID) of the second device. Meanwhile, the data buffer 318, the first RX buffer 316, and the second RX buffer 317 are allocated after the receipt of the identification information of the second device also. The first thread processor 303 is configured to perform services associated with the physical layer while the second thread processor 304 is configured to perform services associated with the data link layer.

To receive the second data stream, the application 314 may notify the LAN driver 312, which in turn communicates with the graphics driver 308. The graphics driver 308 may thus cause the first thread processor 303 to store the second data stream at the second RX buffer 317 upon receipt of the second data stream through the MIO interface 302. The first thread processor 303 may be configured to process the second data stream and put the processed second data stream at the first RX buffer 316.

Once the second data stream has been placed in the first RX buffer 316, the LAN driver 312 may communicate with the graphics driver 308 again. The graphics driver 308 may thus cause the second thread processor 304 to retrieve the second data stream from the first RX buffer 316, process the second data stream if necessary, and store the second data stream to the data buffer 318. Before the storage of the second data stream into the data buffer 318, the LAN driver 312 may further communicate with the graphics driver 308 so that the second data stream may be processed by a processing unit of a graphics system. It is worth noting that the processing by the processing unit of the graphics system could be optional depending on the type of the second data stream. In one implementation, when the second data stream is not graphics-related the processing of the processing unit of the graphics system may not be necessary. On the other hand, when the second data stream is graphics-related, the processing of the processing unit of the graphics system before the storage of the second data stream to the data buffer 318 may be required. The graphics driver 308 may notify the LAN driver 312 when the processed second data stream has been placed into the data buffer 318. The LAN driver 312 may in turn fetch the second data stream from the data buffer 318 for the usage of the application 314.

Though FIGS. 2 and 3 are for the transmission and the receipt of the data stream, respectively, the transmission and the receipt may take place at the same time. In other words, the thread processor associated with the data link layer may fetch the incoming data stream from the RX buffer while the thread processor associated with the physical layer may transmit the outgoing data stream from the TX buffer to the MIO interface.

Figure 4:
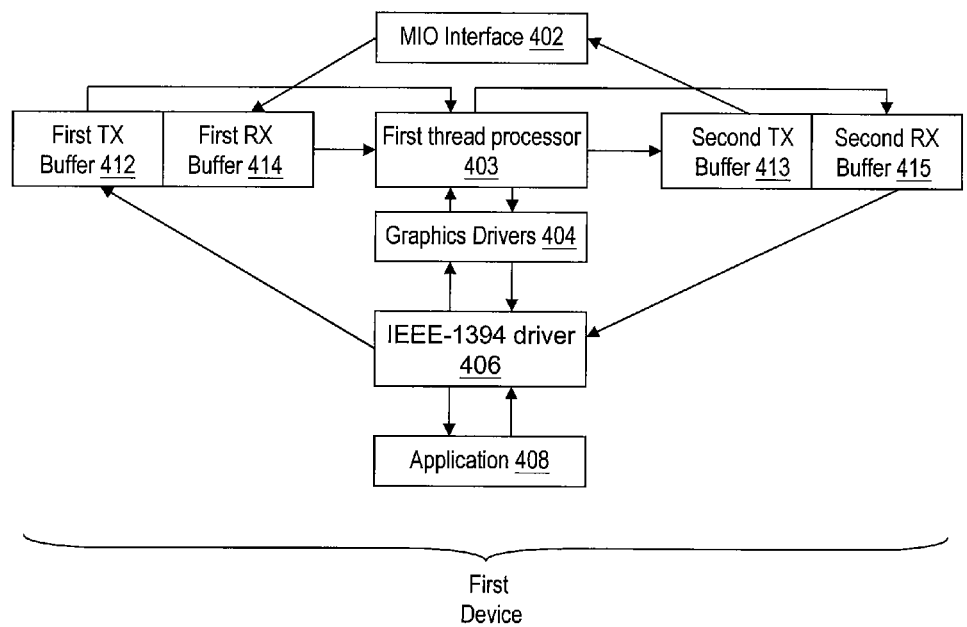
FIG. 4 is a schematic diagram for illustrating an IEEE 1394-based communication between a first device and a second device external to the first device according to one embodiment of the present invention.

FIG. 4 is a schematic diagram 400 for illustrating an IEEE 1394-based communication between a first device and a second device external to the first device according to one embodiment of the present invention. The first device may transmit a first data stream to the second device. The first device may also receive a second data stream from the second device. In one implementation, the second device is an IEEE 1394-based camcorder, and thus the first and the second data stream are a video data stream. In another implementation, the second device is an IEEE 1394-based hard disc. When the second device is the IEEE 1394-based hard disc, the first data stream and the second data stream could be of any format. In one implementation, when both of the first data stream and the second data stream are the video data stream, a thread processor for the communication of a data link layer may not be necessary. Meanwhile, the transmission and the receipt of the first data stream and the second data stream may not require any storage and retrieval associated with a data buffer. Even so, the first device may still comprise a MIO interface 402, a first thread processor 403, a graphics driver 404, an IEEE-1394 driver 406, an application 408, a first receiving (RX) buffer 412, a second RX buffer 413, a first transmitting (TX) buffer 414, and a second TX buffer 415. It is worth noting the first thread processor 403 is for the communication of a physical layer of a processing unit of a graphics system of the first device. And the IEEE-1394 driver 406, specifically for the communication with the 1394-based second device, is loaded after a receipt of identification information associated with the 1394-based second device. And the allocation of the first RX buffer 412, the second RX buffer 413, the first TX buffer 414, and the second TX buffer 415, and the invocation of the first thread processor 403 take place after the receipt of the identification information as well. Though the first RX buffer 412 and the second RX buffer 413 are shown separately, they might occupy the same physical memory space. Similarly, the first TX buffer 414 and the second TX buffer 415 are shown separately for the illustration purpose.

The second data stream, which is received through the MIO interface 402, is firstly stored in the first RX buffer 414. The IEEE-1394 driver 406 may communicate with the graphics driver 404 to cause the first thread processor 403 to fetch the second data stream from the first RX buffer 414. The first thread processor may be configured to process the second data stream and put the processed second data stream at the second RX buffer 415. Thus, the IEEE-1394 driver 406 may fetch the second data stream from the second RX buffer 415.

Meanwhile, IEEE-1394 driver 406 may also have the first data stream stored in the first TX buffer 412. The IEEE-1394 driver 406 may also communicate with the graphics driver 404 to cause the first thread processor 403 to retrieve and process the first data stream and to put the processed first data stream at the second TX buffer 413. The IEEE-1394 driver may be configured to further cause the first data stream to be transmitted to the MIO interface 402.

Figure 5:
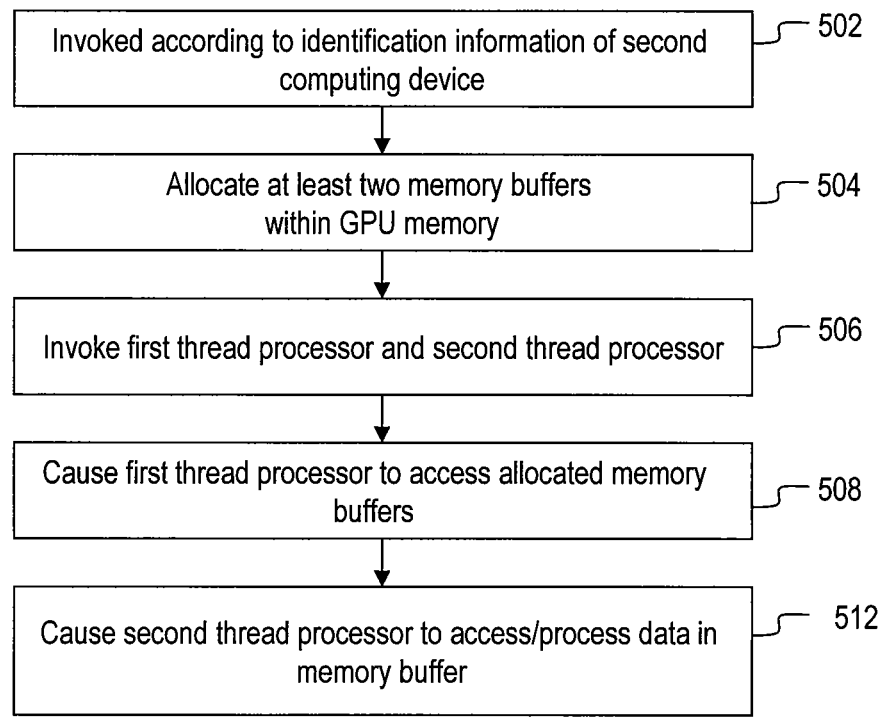
FIG. 5 is a flowchart illustrating example operations for a first driver to facilitate a communication between a processing unit of a graphics system and an external device according to one embodiment of the present invention.

FIG. 5 is a flowchart illustrating example operations for a first driver to facilitate a communication between a processing unit of a graphics system and an external device according to one embodiment of the present invention. The first driver is stored in a first device hosting the graphics system. In one implementation, the first driver is a LAN driver for a LAN communication between the first device and the second device. In another implementation, the first driver is a driver for a second device that could be in communication with the first device directly. In step 502, the first driver may be invoked according to identification information of the second device.

In step 504, the first driver causes an allocation of at least two memory buffers within a memory associated with processing unit of the graphics system for the communication between the first device and the second device. When the second device is the 1394-based device, a transmitting (TX) buffer and a receiving (RX) buffer are to be allocated for the communication. When the second device is to communicate with the first device through the LAN, a data buffer in addition to the TX buffer and the RX buffer may be allocated.

In step 506, the first driver causes the graphics driver to invoke a first thread processor and a second thread processor of a processing unit of the first device. In one implementation, the processing unit is a GPU. To invoke the first thread processor of the processing unit, the first driver may communicate with the graphics driver. In step 508, the first driver causes the invoked first thread processor to access the memory buffers. The first driver may communicate with the graphics driver so that the graphics driver may then utilize the invoked first thread processor to fetch the outgoing data stream from the TX buffer and put the fetched outgoing data stream to an input/output (I/O) interface, or transmit the incoming data stream to the RX buffer from the I/O interface.

It is worth noting that when the first device communicates with the second device the first driver may invoke a second thread processor and allocate additional memory buffers. In step 512, the first driver may also cause the invoked second thread processor to access the memory buffers. The first driver may communicate with the graphics driver to cause the second thread processor to fetch the outgoing data stream from the data buffer and put the fetched outgoing data stream to the TX buffer. The first driver may also communicate with the graphics driver to cause the second thread processor to fetch the incoming data stream from the RX buffer and put the data stream to the data buffer. In step 512, the first driver may also cause the second thread processor to process the incoming data stream and the outgoing data stream.

While the forgoing is directed to implementations of the present invention, other and further implementations of the invention may be devised without departing from the basic scope thereof. For example, aspects of the present invention may be implemented in hardware or software or in a combination of hardware and software. One implementation of the invention may be implemented as a program product for use with a computer system. The program(s) of the program product define functions of the implementations (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are implementations of the present invention.

Therefore, the scope of the present invention is determined by the claims that follow.

We claim:

1. A method for communicating with an external device through a processing unit in a graphics system of a computing device, comprising:
retrieving identification information of the external device, wherein the identification information causes a corresponding driver to be invoked or installed;
allocating a first set of memory buffers having a first memory buffer and a second memory buffer in the graphics system based on the identification information of the external device;
subsequent to retrieving the identification information of the external device, receiving a first data stream from the external device through an input/output (I/O) interface of the processing unit of the graphics system; and
invoking a first thread processor of the processing unit of the graphics system to perform services associated with a physical layer according to the identification information of the external device by storing the first data stream in the first memory buffer and retrieving a second data stream from the second memory buffer for transmission to the external device through the I/O interface of the processing unit.

2. The method of claim 1, further comprising invoking a second thread processor to perform services associated with a data link layer according to the identification information of the external device.

3. The method of claim 2, further comprising causing the second thread processor to access a third memory buffer from the first set of memory buffers.

4. The method of claim 1, further comprising causing the processing unit of the graphics system to process the first data stream and the second data stream.

5. The method of claim 1, wherein a number of the first set of the memory buffers is predetermined.

6. The method of claim 1, further comprising causing the first thread processor to have the first data stream transmitted to a system input/output (I/O) port of the computing device and to have the second data stream received from the system I/O port.

7. The method of claim 6, further comprising causing the first thread processor to packetize the first data stream before having the first data stream transmitted to the system I/O port.

8. The method of claim 1, wherein the identification information of the external device is received from the external device through a system input/output (I/O) port.

9. The method of claim 1, wherein the computing device is preconfigured with the identification information of the external device.

10. A computing device for communicating with an external device, comprising:
   a first processing unit;
   a system memory;
   a system interface; and
   a graphics system having a second processing unit having a graphics memory and an input/output (I/O) interface;
   wherein the second processing unit is configured to perform the steps of:
      retrieving identification information of the external device, wherein the identification information causes a corresponding driver to be invoked or installed;
      allocating a first set of memory buffers having a first memory buffer and a second memory buffer in the graphics system based on the identification information of the external device;
      subsequent to retrieving the identification information of the external device, receiving a first data stream from the external device through an input/output (I/O) interface of the second processing unit; and
      invoking a first thread processor of the second processing unit to perform services associated with a physical layer according to the identification information of the external device by storing the first data stream in the first memory buffer and retrieving a second data stream from the second memory buffer for transmission to the external device through the I/O interface of the second processing unit.

11. The system of claim 10, wherein the second processing unit is further configured to invoke a second thread processor to perform services associated with a data link layer according to the identification information of the external device.

12. The system of claim 11, wherein the second processing unit is further configured to cause the second thread processor to access a third memory buffer from the first set of the memory buffers.

13. The system of claim 10, wherein the second processing unit is configured to process the first data stream and the second data stream.

14. The system of claim 10, wherein a number of the first set of the memory buffers is predetermined.

15. The system of claim 10, wherein the first thread processor is further configured to have the first data stream transmitted to a system input/output (I/O) port of the computing device and to have the second data stream received from the system I/O port.

16. The system of claim 15, wherein the first thread processor is configured to packetize the first data stream before having the first data stream transmitted to the system I/O port.

17. A non-transitory computer-readable medium containing a sequence of instructions for a computing device to communicate with an external device, which when executed by a processing unit in a graphics system of the computing device, causes the processing unit of the graphics system to perform the steps of:
   retrieving identification information of the external device, wherein the identification information causes a corresponding driver to be invoked or installed;
   allocating a first set of memory buffers having a first memory buffer and a second memory buffer in the graphics system based on the identification information of the external device;
   subsequent to retrieving the identification information of the external device, receiving a first data stream from the external device through an input/output (I/O) interface of the processing unit of the graphics system; and
   invoking a first thread processor of the processing unit of the graphics system to perform services associated with a physical layer according to the identification information of the external device by storing the first data stream in the first memory buffer and retrieving a second data stream from the second memory buffer for transmission to the external device through the I/O interface.

18. The non-transitory computer-readable medium of claim 17, further comprising a sequence of instructions when executed causes the processing unit of the graphics system to invoke a second thread processor to perform services associated with a data link layer according to the identification information.

19. The non-transitory computer-readable medium of claim 18, further comprising a sequence of instructions when executed causes the second thread processor to access a third memory buffer from the first set of the memory buffers.

20. The non-transitory computer-readable medium of claim 17, wherein a number of the first set of the memory buffers is predetermined.

21. The non-transitory computer-readable medium of claim 17, further comprising a sequence of instructions when executed causes the first thread to have the first data stream transmitted to a system input/output (I/O) port of the computing device and to have the second data stream received from the system I/O port.

22. The non-transitory computer-readable medium of claim 21, further comprising a sequence of instructions when executed causes the first thread processor to packetize the first data stream before having the first data stream transmitted to the system I/O port.

* * * * *